(12) United States Patent
Liu et al.

(10) Patent No.: US 8,724,440 B1
(45) Date of Patent: May 13, 2014

(54) METHOD AND CIRCUIT FOR DECODING A SAMPLE OF A SIGNAL READ FROM A STORAGE MEDIUM TO OBTAIN A PHYSICAL ADDRESS OF DATA ON THE STORAGE MEDIUM

(71) Applicant: Marvell International Ltd., Hamilton (BM)

(72) Inventors: Jingfeng Liu, Longmont, CO (US); Wooi-Kean Lee, Broomfield, CO (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/042,831

(22) Filed: Oct. 1, 2013

Related U.S. Application Data

(63) Continuation of application No. 13/180,476, filed on Jul. 11, 2011, now Pat. No. 8,547,813, which is a continuation of application No. 11/856,595, filed on Sep. 17, 2007, now Pat. No. 7,978,579.

(60) Provisional application No. 60/826,031, filed on Sep. 18, 2006.

(51) Int. Cl.
*G11B 20/10* (2006.01)
(52) U.S. Cl.
USPC ..................................................... 369/53.34
(58) Field of Classification Search
None
See application file for complete search history.

(56) References Cited

U.S. PATENT DOCUMENTS

| 6,345,018 | B1 | 2/2002 | Maegawa et al. |
| RE39,513 | E | 3/2007 | Maegawa et al. |
| 7,400,561 | B2 | 7/2008 | Serrano et al. |
| 2003/0099180 | A1 | 5/2003 | Park et al. |
| 2005/0068866 | A1 | 3/2005 | Serrano et al. |
| 2006/0077849 | A1 | 4/2006 | Chen et al. |
| 2006/0126454 | A1* | 6/2006 | Serrano et al. ............. 369/44.13 |

OTHER PUBLICATIONS

ECMA International, "Data Interchange on 120 mm and 80 mm Optical Disk using + RW Format—Capacity: 4, 7 and 1, 46 Gbytes per Side", (Recording speed up to 4X), Rue du Rhone 114, CH-1204, Geneva, www.ecma-international.org, Standard ECMA-337, 3rd Edition, Dec. 2005; pp. 1-143.

* cited by examiner

*Primary Examiner* — Wayne Young
*Assistant Examiner* — Mark Fischer

(57) ABSTRACT

A circuit includes a converter that samples a signal read from a storage medium to generate a sample. The signal includes a physical address of data read from a track on the storage medium. A timing control device generates a clock signal based on a deviation of the track from a reference line. A scaling device generates a scale factor based on the clock signal. A multiplier multiplies the sample by the scale factor to generate a scaled sample. An integrator integrates the scaled sample over a period of the clock signal to generate a resultant value. A comparator compares the resultant value to a threshold to generate an output. The output indicates whether no phase imperfection exists in the scaled sample. A decoder, based on the output of the comparator, decodes the resultant value to obtain the physical address of the data.

20 Claims, 7 Drawing Sheets

METHOD AND CIRCUIT FOR DECODING A SAMPLE OF A SIGNAL READ FROM A STORAGE MEDIUM TO OBTAIN A PHYSICAL ADDRESS OF DATA ON THE STORAGE MEDIUM

CROSS-REFERENCE TO RELATED APPLICATION

The present disclosure is a continuation of U.S. patent application Ser. No. 13/180,476 (now U.S. Pat. No. 8,547,813), filed Jul. 11, 2011, which is a continuation of U.S. patent application Ser. No. 11/856,595 (now U.S. Pat. No. 7,978,579), filed on Sep. 17, 2007, which claims the benefit of U.S. Provisional Application No. 60/826,031, filed on Sep. 18, 2006. The entire disclosures of the applications referenced above are incorporated herein by reference.

FIELD

This invention relates generally to storing data on an optical disc, and more particularly to a wobble detection circuit, including such a circuit for use in video disc recording media employing Binary Phase Shift Keying (BPSK).

BACKGROUND

Certain optical disc standards, such as HD DVD and DVD+(R and RW), employ BPSK to encode address or location data in the form of bits 0 and 1 on a wobble of an optical disc. During mastering or recording of a disc, this addressing data may be stored as phase modulated data, which is known in the art as Address-in-Pregroove (ADIP). The wobble is a continuous sinusoidal deviation of a track from an average centerline. A wobble signal also may be read from the wobble by a recording drive to precisely rotate the disc according to the frequency of the wobble signal. Using the frequency of the wobble signal, a timing signal may be generated to be used when writing data to the disc. An exemplary embodiment of a disc using BPSK encoding may have data bit 0 represented by a wobble with a first phase (i.e., a normal phase) and data bit 1 represented by a wobble with a second phase 180 degrees apart from the first phase (i.e., an inverted phase). During the mastering process, phase change transitions from a wobble having a normal phase to a wobble having an inverted phase may not be perfect. The inverted phase may extend to its neighboring normal phase wobble or vice versa.

FIG. 1 illustrates an example of a phase change transition problem using a captured HD DVD wobble signal waveform. FIG. 1 shows a captured wobble signal 110 in relation to a wobble clock signal 105. Four arrows 115, 120, 125, 130 point to imperfect phase change transitions from a wobble signal with a normal phase to a wobble signal with an inverted phase. The imperfect phase transitions degrade the performance of wobble signal detection, thereby hampering detection of addressing or ADIP data stored on the wobble of the disc.

Therefore, it would be desirable to have an apparatus that can detect and correct phase transition imperfections associated with optical disc wobble, particularly optical discs storing signals using BPSK.

SUMMARY

A circuit is provided and includes a converter, a timing control device, a first scaling device, a first multiplier, a first integrator, a comparator, and a decoder. The converter is configured to sample a signal read from a storage medium to generate a sample. The signal includes a physical address of data read from a track on the storage medium. The timing control device is configured to generate a clock signal based on a deviation of the track from a reference line. The first scaling device is configured to generate a first scale factor based on the clock signal. The first multiplier is configured to multiply the sample by the first scale factor to generate a first scaled sample. The first integrator is configured to integrate the first scaled sample over a period of the clock signal to generate a first resultant value. The comparator is configured to compare the first resultant value to a threshold to generate an output. The output indicates whether no phase imperfection exists in the first scaled sample. The decoder is configured to, based on the output of the comparator, decode the first resultant value to obtain the physical address of the data.

In other features, a method is provided and includes: sampling, via a converter, a signal read from a storage medium to generate a sample, where the signal includes a physical address of data read from a track on the storage medium; generating a clock signal based on a deviation of the track from a reference line; and generating a first scale factor based on the clock signal. The method further includes: multiplying the sample by the first scale factor to generate a first scaled sample; integrating the first scaled sample over a period of the clock signal to generate a first resultant value; and comparing the first resultant value to a threshold to generate an output, where the output indicates whether no phase imperfection exists in the first scaled sample. The method further includes, based on the output of the comparator, decoding the first resultant value to obtain the physical address of the data.

To address the stated need and fulfill other desired objectives, in accordance with one embodiment of the invention, a wobble detector may detect a wobble signal and a synchronization signal based on the wobble signal and may provide a wobble clock signal. A wobble signal phase imperfection detector may detect and correct a phase transition imperfection in the wobble signal. The imperfection detector may integrate a first scaled wobble signal sample over substantially a half period portion of the wobble clock signal; compare the first scaled wobble signal sample integrated over substantially one period of the wobble clock signal to a variable threshold value; and based on the comparison, output either the half period integrated and scaled wobble sample or the first scaled wobble sample integrated over one period of the wobble clock signal. The imperfection detector further may decode the output to obtain wobble address period data. In one embodiment, the imperfection detector may include a half-period integrator, a comparator, a selector, and a decoder to perform the indicated functions.

DESCRIPTION

Figure 1:
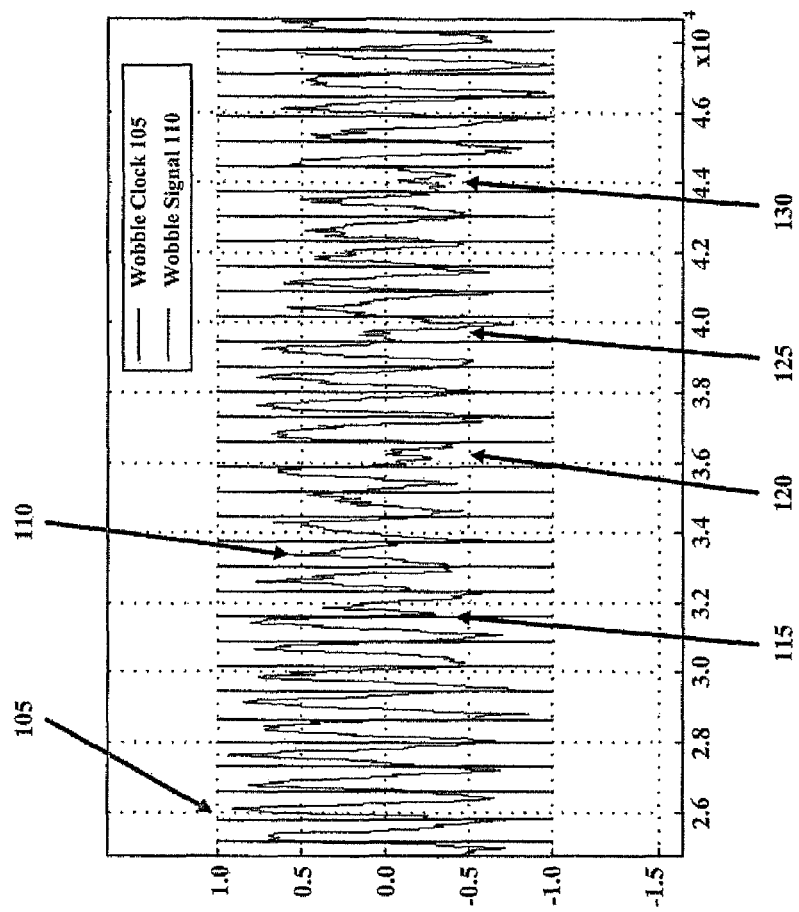
FIG. 1 illustrates a graph of a captured HD wobble waveform.
Figure 2:
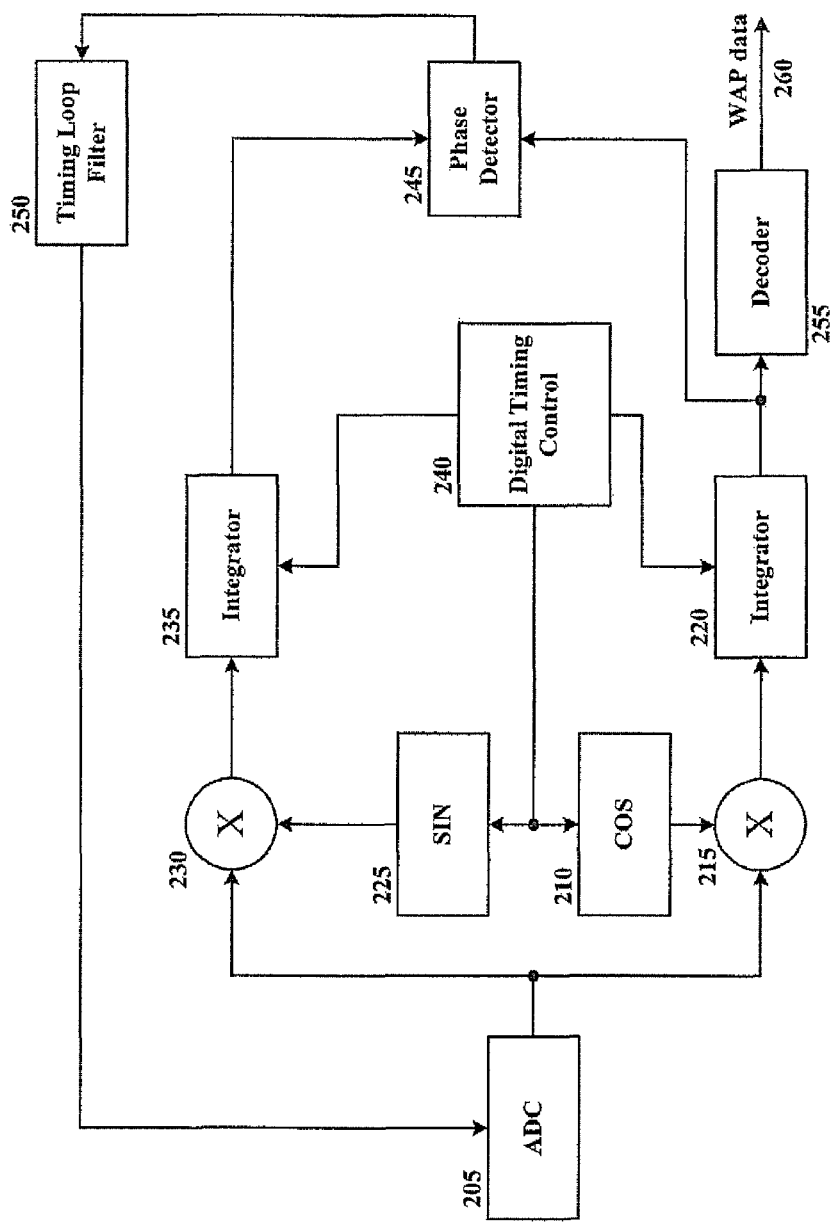
FIG. 2 illustrates a block diagram of one embodiment of a wobble demodulator.

FIG. 2 illustrates a block diagram of one embodiment of a wobble demodulator. An analog-to-digital (A/D) converter 205 may convert addressing data into digital samples using a filtered timing error signal provided by a timing loop filter 250 as a clock. The digital samples may be received and manipulated by two branches of the wobble demodulator. A first branch may include a first multiplier 215 and a first integrator 220. The first multiplier 215 may receive the digital sample from the A/D converter 205 and may multiply the sample by a first scaling factor. In this embodiment, the first scaling factor may be a cosine function 210 (an in-phase component). The scaled sample may be received by the first integrator 220, which may integrate the scaled sample over one period of a wobble clock signal. The resulted integrated sum may be output by the integrator 220. The wobble clock signal may be supplied to the first integrator 220 by a digital timing controller 240 which generates the wobble clock signal.

A second branch may include a second multiplier 230 and a second integrator 235. The second multiplier 230 may receive the digital sample from the A/D converter 205 and may multiply the sample by a second scaling factor. In this embodiment, the second scaling factor may be a sine function 225 (a quadrature component). The second scaled sample may be passed to the second integrator 235, which may integrate the second scaled sample over one period of the wobble clock signal. The integrator 235 may receive the wobble clock signal from the digital timing controller 240. Together, the two scaled and integrated samples may pass to a phase detector 245, which may generate phase information using the two samples. In one embodiment, the phase detector 245 may employ an arctangent function to generate the phase information. The phase information generated may be used as a timing error signal. This timing error signal may pass to the timing loop filter 250, which may filter the timing error signal. The resulting filtered timing error signal may serve as the clock for the A/D converter 205. The first scaled and integrated sample, output by the first integrator 220, may also pass to a decoder 255. The decoder 255 may decode wobble address period (WAP) data 260, otherwise known as physical addressing data, from the integrated sample and provide it to be used by the recording drive.

Figure 3:
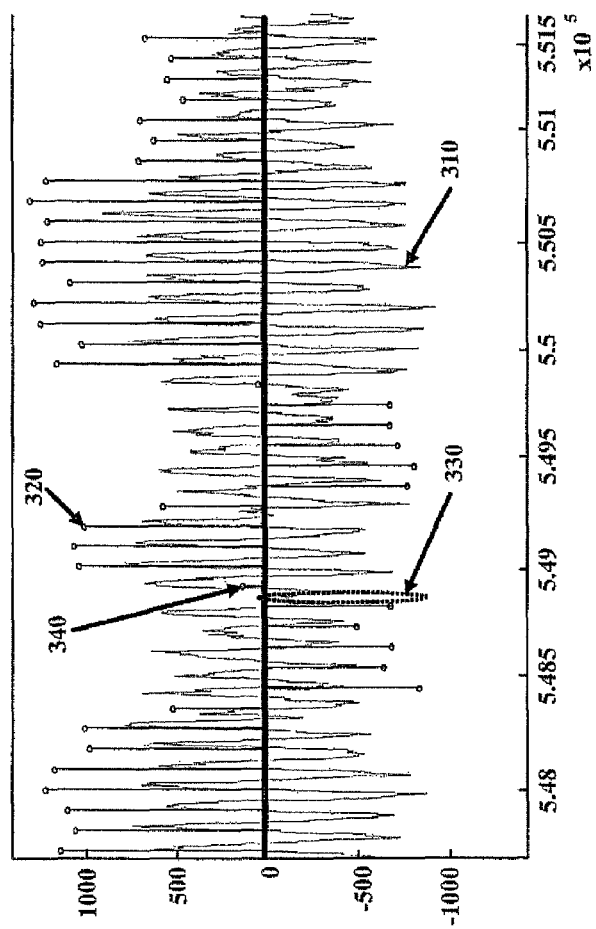
FIG. 3 is a graph illustrating phase transition imperfections suffered by the wobble demodulator of FIG. 2.

FIG. 3 is a graph illustrating phase transition imperfections suffered by the wobble demodulator of FIG. 2. The graph illustrates one embodiment of a wobble signal 310. The graph of the wobble signal 310 includes data points such as 320 which embody the output of the second integrator 235. A phase transition imperfection in the wobble signal 310 may be seen as the circled portion 330 of the wobble signal 310, in which the phase of a (n+1)st wobble sample extends into the nth wobble sample. This phase imperfection may cause the wobble demodulator to output an incorrect integrator output, as shown by the data point 340.

Figure 4:
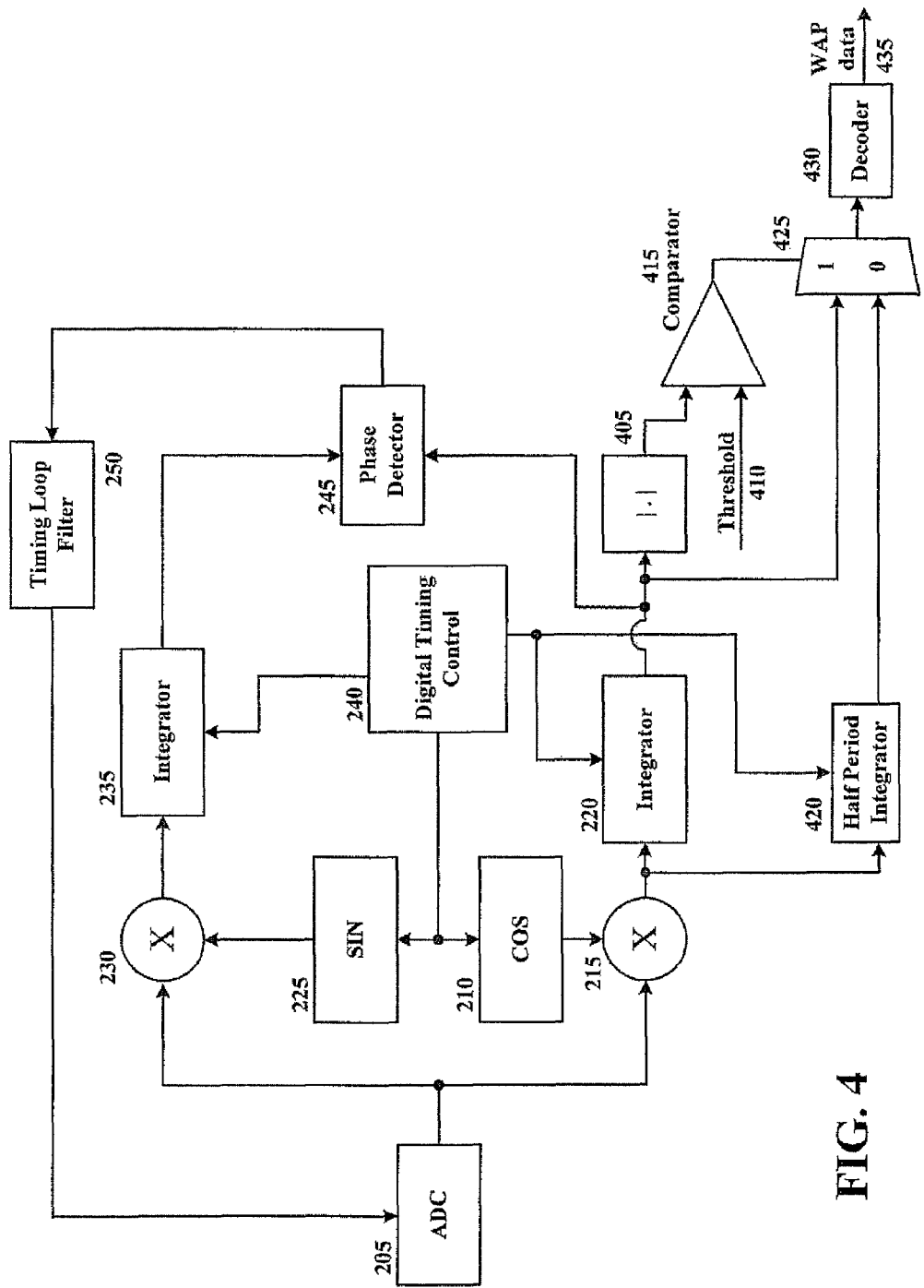
FIG. 4 illustrates a block diagram of one embodiment of a wobble demodulator with a circuit to correct a phase transition imperfection.

FIG. 4 is a block diagram illustrating one embodiment of a wobble demodulator with a circuit to correct a phase transition imperfection. The wobble demodulator may include many of the same components as found in the wobble demodulator illustrated by FIG. 2 and described in the corresponding paragraphs. These elements in FIG. 4 have the same reference numerals as in FIG. 2, for ease of reference. However, it should be understood that the inventive circuitry may be employed with other wobble demodulators, and that FIG. 4 is merely a non-limiting example.

In FIG. 4, the A/D converter 205 may provide digital wobble signal samples to a first and a second branch, each of which may have a multiplier and an integrator. The first multiplier 215 found in the first branch may multiply the sample by a first scaling factor 210, which in one embodiment, may be a cosine function (an in-phase component). The first integrator 120 may receive the first scaled sample and may integrate it over exactly one period of a wobble clock signal. The wobble clock signal may be generated and supplied by a digital timing controller 240.

The second multiplier 230 of the second branch may multiply the sample by a second scaling factor 225, which in one embodiment, may be a sine function (a quadrature component). The second integrator 235 may receive the second scaled sample and may integrate it exactly one period of the wobble clock signal, which may be supplied to the second integrator by the digital timing controller 240. The two scaled and integrated samples may pass to a phase detector 245 which may generate phase information using the samples. In one embodiment, the phase detector 245 may employ an arctangent function to generate the phase information. The phase information may serve as a timing error signal, which may pass to a timing loop filter 250. The timing loop filter 250 may smooth the timing error signal and provide the resulting filtered timing error signal to the A/D converter 205.

The phase transition imperfection detector circuit attached to the wobble demodulator may include an absolute value circuit 405, a comparator 415, a half-period integrator 420, a selector 425, and a decoder 430. The absolute value circuit 405 may calculate the absolute value of the output of the first integrator 220. The resulting numerical value of the integration result may be compared to a programmable threshold value 410 by a comparator 415. If the absolute value of the first scaled and integrated sample is greater than the programmable threshold value, then the selector 425 may select the first scaled and integrated sample. This selection of this sample may indicate that no phase transition imperfection problem exists with this particular sample. In one embodiment, the selector 425 may be a switch.

If the absolute value of the first scaled and integrated sample is less than the programmable threshold value, then a phase transition imperfection may exist for the particular sample. Generally, the phase transition imperfection may occur during the first half or the second half of the wobble clock signal period. As a result, a half-period integrator 420 may integrate the first scaled signal over the half of the wobble clock signal period which does not cause the phase transition imperfection (i.e., either the first half period or the second half period of the wobble clock signal). The choice of which half period to integrate the sample over may be made by the digital timing controller 240. The digital timing controller 240 may use an algorithm to determine whether to integrate the first scaled sample over the first half period or the second half period of the wobble clock signal. The half period integrator 420 may integrate the first scaled sample over the half period (i.e., first or second) chosen by the digital timing controller 240. The selector 425 may select the half period integrated result as its output, and the half period integrated result may then be decoded by a decoder 430 to obtain wobble address period data 435.

Figure 5:
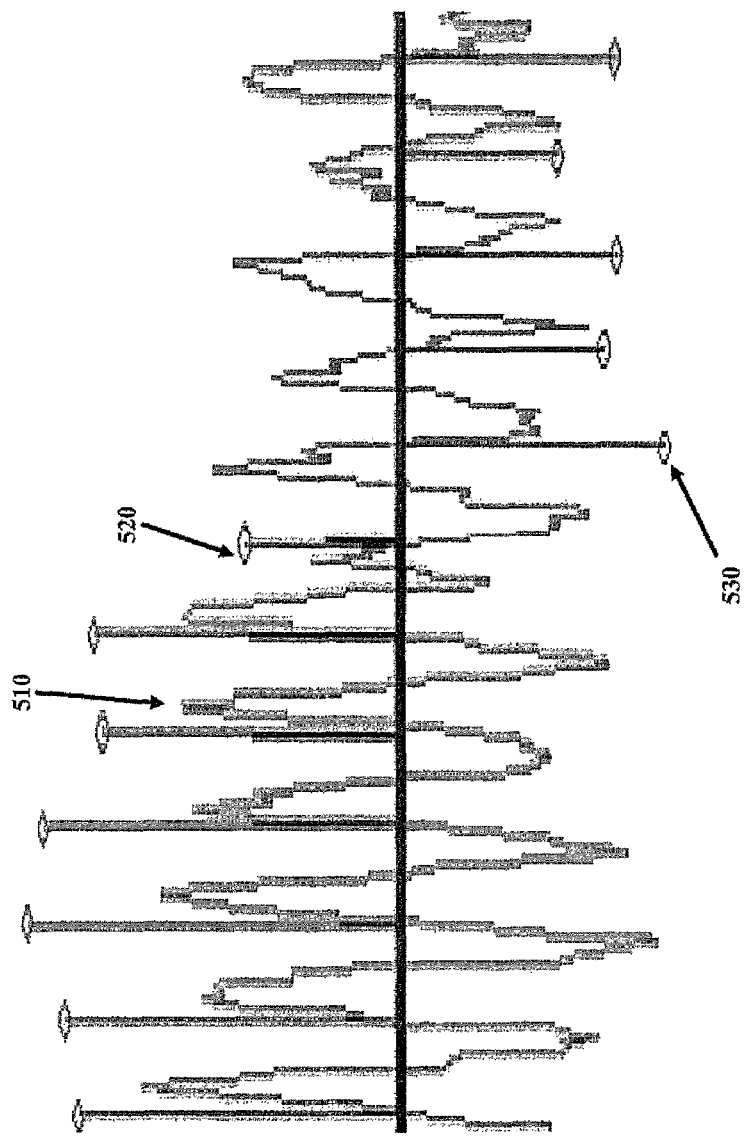
FIG. 5 is a graph illustrating one embodiment of an algorithm used in correcting a phase transition imperfection.

FIG. 5 is a graph illustrating one embodiment of an algorithm used in correcting a phase transition imperfection. As described above, if the absolute value of the first scaled and integrated sample is less than the threshold, a phase transition imperfection may exist in a wobble signal 510. The phase transition imperfection may affect the integration of the first scaled wobble sample over the whole period; accordingly, integration of the first scaled wobble sample over a smaller period of the wobble clock may eliminate the phase transition imperfection. In one embodiment, half periods may be used by a half period integrator in integrating the first scaled wobble sample. A digital timing controller 240, as shown in FIGS. 2 and 4, may select which half period is to be used by implementing an algorithm.

To determine which half period to use in the integration, in one embodiment, the algorithm may compare two consecutive whole period integrated results, designated in this embodiment as I_A 520 and I_B 530, which occur at the first transition of a synchronization mark. A synchronization mark may be a sequence of bits representing a sequence of wobble signal samples, with one bit representing one wobble sample. In one embodiment, a sequence of six wobbles with values of +1, followed by four wobbles with values of −1, and six wobbles with values of +1 may indicate the detection of a synchronization mark (i.e., a 6-4-6 synchronization mark). The 6-4-6 pattern is merely an example; numerous types of synchronization marks employing different patterns of +1 wobble values and −1 wobble values will be apparent to those skilled in the art.

In the case of the exemplary 6-4-6 synchronization mark, the first transition of the synchronization mark may occur upon the transition of the last of the first six +1 values to the first of the four wobbles having a −1 value. At this point, whole period integrated results I_A 520 (representative of the last of the first six +1 wobble values) and I_B 530 (representative of the first of the four −1 wobble values) may be compared. If the difference in the absolute value of I_A 520 and the absolute value of I_B 530 is greater than the negative of the programmable threshold value (i.e. abs (I_A)−abs (I_B) >−threshold), then the digital timing controller 240 may integrate the first scaled sample over the first half period of the wobble clock signal. If the difference in the absolute value of I_A 520 and the absolute value of I_B 530 is greater than the programmable threshold (i.e. abs (I_A)−abs (I_B)>threshold), then the second half period of the wobble clock signal may be used to integrate the first scaled sample. If neither comparison is true, then the half period integrator 420 may not be used because no phase transition imperfection exists. Other algorithms also may be used in place of the above-described algorithm in determining which half period is used to integrate the first scaled sample.

Figure 6:
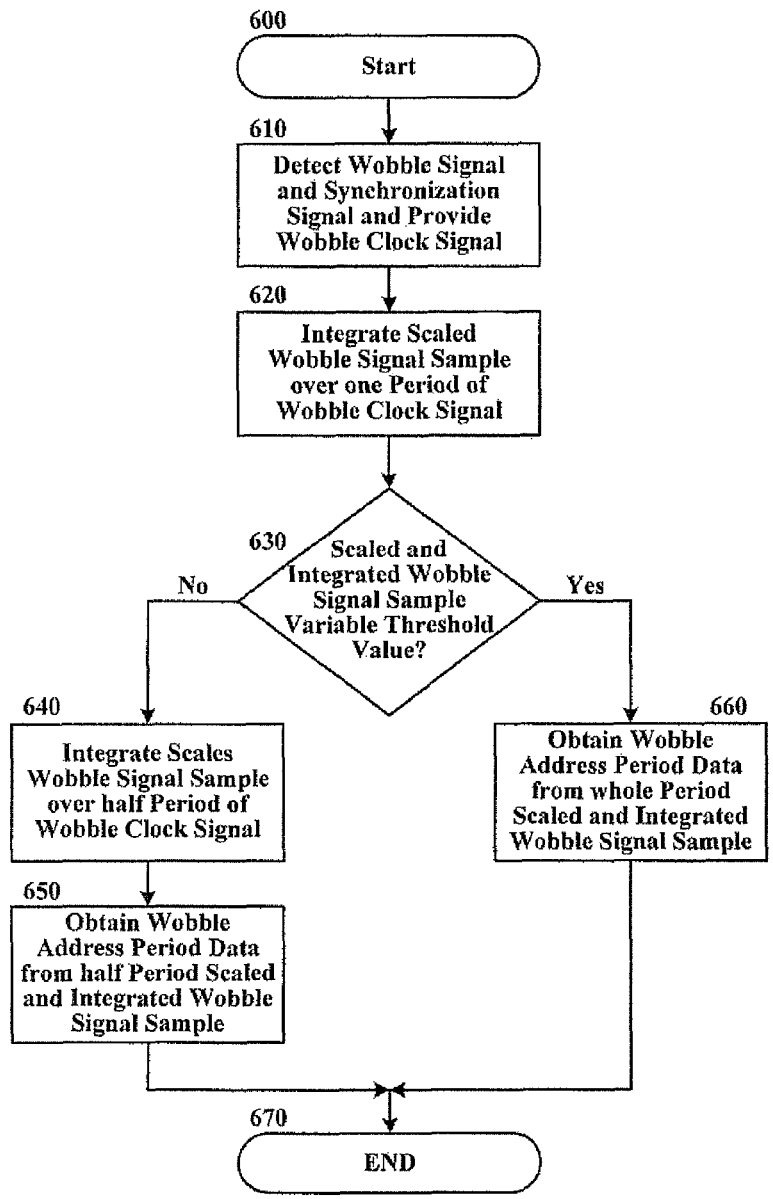
FIG. 6 is a flowchart illustrating one embodiment of the inventive method for correcting a wobble signal phase transition imperfection.

FIG. 6 illustrates one embodiment of the inventive method for correcting a wobble signal phase transition imperfection. In block 610, a wobble detector may detect a wobble signal from an optical recording medium and a synchronization signal based on the wobble signal. A wobble clock signal may be provided or generated based on the detected wobble signal. In block 620, a detected wobble signal may be converted into wobble signal samples. The wobble signal sample may be scaled by a first scaling factor, such as a cosine function (an in-phase component). The scaled wobble signal sample may be integrated over one period of the wobble clock signal. In decision block 630, the scaled and integrated wobble signal sample may be compared to a variable threshold value. A scaled and integrated wobble signal sample having a value greater than the variable threshold value may indicate that no phase imperfection exists in the wobble signal. As a result, in block 660, the scaled and integrated wobble signal sample may be decoded to obtain wobble address period data. A scaled and integrated wobble signal sample having a value less than the variable threshold value may indicate that a phase imperfection may exist in the wobble signal. Generally, a phase imperfection may occur during the first half or the second half of the wobble clock signal period. In block 640, the scaled wobble signal sample may be integrated over a half period of the wobble clock signal. A controller, such as the digital timing controller 240 of FIG. 2, may determine whether to integrate the scaled wobble signal sample over the first half or the second half of the wobble clock signal period. The controller may use an algorithm, such as the algorithm embodiment of FIG. 5, to determine which half of the wobble clock signal period to use in integrating the scaled wobble clock signal. Subsequent to the integration of the scaled wobble signal sample over a half period of the wobble clock signal period, in block 650, the half period integrated and scaled wobble signal sample may be decoded to obtain wobble address period data.

Figure 7:
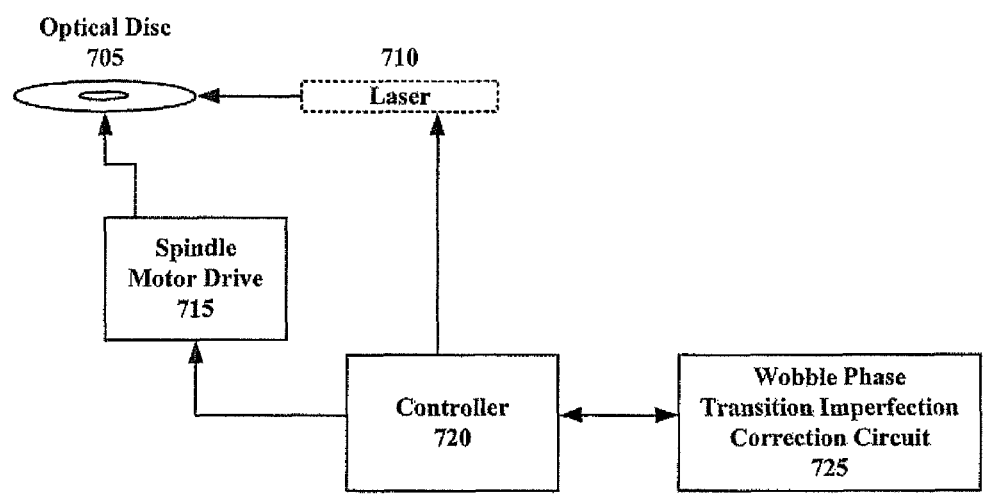
FIG. 7 is a diagram illustrating an embodiment of a portion of a multimedia recording system incorporating a wobble signal phase transition imperfection correction circuit.

FIG. 7 is a diagram of an embodiment of a portion of a multimedia recording system incorporating a wobble signal phase transition imperfection correction circuit. An optical disc 705, conforming to any standards which employs BPSK encoding, such as DVD, HD-DVD, or DVD+(R or RW), may spin at a predetermined speed. A spindle motor drive 715 may control how fast the disc spins. While the disc is spinning, an optical device (shown solely by way of example in FIG. 7 as a laser 710) may write data to the disc. The laser 710 and the spindle motor drive 715 may be controlled by a controller. The disc 705 may contain a wobble, which stores address or location data in the form of phase modulated data. A wobble signal may be read from the wobble as the disc spins. The wobble signal may help precisely rotate the disc during the recording process. A timing signal also may be generated from the wobble signal to aid in the recording of data on the disc. However, as described above, imperfect phase transitions between phases representing 0 bits and phases representing 1 bits may cause the wobble signal to be read imperfectly. The wobble signal phase transition imperfection correction circuit 725 may be electrically coupled to the controller 720 and may correct such phase transition imperfections as they are detected. The wobble signal phase transition imperfection correction circuit 725 may correct these imperfections using the embodiments described above.

Embodiments of the invention described above may be used in or incorporated into fields and devices employing binary phase shift keying (BPSK), including, but not limited to, communications systems and wireless protocols, and optical discs, including various forms of video discs such as DVDs, HD-DVDs, and DVD+(R or RW), where it is desirable to correct timing problems. For example, embodiments of the invention described above may be used to correct timing problems in communications systems and wireless protocols which employ BPSK and suffer from timing problems associated with BPSK. Embodiments of the invention described above also may be used in various optical and video disc formats, such as HD DVD, DVD+R, and DVD+RW, to correct timing problems associated with the use of BPSK to encode data.

In addition to these exemplary embodiments, those skilled in the art will recognize that numerous applications of the above-described embodiments are possible, and that disclosure of the just-described applications does not limit the invention to these applications. Rather, all suitable applications fall within the scope of the invention. Therefore, the foregoing is illustrative only of the principles of the invention. Further, those skilled in the art will recognize that numerous modifications and changes are possible, the disclosure of the just-described embodiments does not limit the invention to the exact construction and operation shown, and accordingly, all suitable modifications and equivalents fall within the scope of the invention.

What is claimed is:

1. A circuit comprising:
   a converter configured to sample a signal read from a storage medium to generate a sample, wherein the signal includes a physical address of data read from a track on the storage medium;
   a timing control device configured to generate a clock signal based on a deviation of the track from a reference line;
   a first scaling device configured to generate a first scale factor based on the clock signal;
   a first multiplier configured to multiply the sample by the first scale factor to generate a first scaled sample;
   a first integrator configured to integrate the first scaled sample over a period of the clock signal to generate a first resultant value;
   a comparator configured to compare the first resultant value to a threshold to generate an output, wherein the output indicates whether no phase imperfection exists in the first scaled sample; and
   a decoder configured to, based on the output of the comparator, decode the first resultant value to obtain the physical address of the data.

2. The circuit of claim 1, wherein the deviation of the track is a sinusoidal deviation of the track relative to the reference line.

3. The circuit of claim 1, further comprising:
   a second integrator configured to integrate the first scaled sample over a half of the period of the clock signal to generate a second resultant value; and
   a multiplexer configured to, based on the output of the comparator, output the first resultant value or the second resultant value,
   wherein the decoder is configured to decode the first resultant value or the second resultant value to obtain the physical address of the data.

4. The circuit of claim 3, wherein the half of the period of the clock signal is (i) a first half of the period of the clock signal, or (ii) a second half of the period of the clock signal.

5. The circuit of claim 3, wherein:
   if the first resultant value is greater than the threshold, (i) the comparator outputs the first resultant value, and (ii) the decoder is configured to decode the first resultant value; and
   if the first resultant value is less than the threshold, (i) the comparator outputs the second resultant value, and (ii) the decoder is configured to decode the second resultant value.

6. The circuit of claim 3, further comprising an absolute value device configured to determine an absolute value of the first resultant value,
   wherein the comparator is configured to compare the absolute value of the first resultant value to the threshold to generate the output of the comparator.

7. The circuit of claim 3, wherein:
   if an output of the multiplexer is the first resultant value, no phase imperfection exists in the first scaled sample; and
   if the output of the multiplexer is the second resultant value, (i) a phase imperfection exists in the first scaled sample, or (ii) no phase imperfection exists in the first scaled sample.

8. The circuit of claim 3, further comprising:
   a second scaling device configured to generate a second scale factor based on the clock signal;
   a second multiplier configured to multiply the sample out of the converter by the second scale factor to generate a second scaled sample;
   a third integrator configured to integrate the second scaled sample over the period of the clock signal to generate a third resultant value; and
   a detector configured to generate an error signal based on the first resultant value and the third resultant value,
   wherein the converter is configured to sample the signal read from the storage medium based on the error signal.

9. A system comprising:
   the circuit of claim 8; and
   a controller configured to (i) read from and write to the storage medium, and (ii) based on the error signal, control a rotation of the storage medium.

10. The circuit of claim 1, further comprising:
    a second scaling device configured to generate a second scale factor based on the clock signal;
    a second multiplier configured to multiply the sample out of the converter by the second scale factor to generate a second scaled sample;
    a second integrator configured to integrate the second scaled sample over the period of the clock signal to generate a second resultant value; and
    a detector configured to generate an error signal based on the first resultant value and the second resultant value,
    wherein the converter is configured to sample the signal read from the storage medium based on the error signal.

11. A system comprising:
    the circuit of claim 10; and
    a controller configured to (i) read from and write to the storage medium, and (ii) based on the error signal, control a rotation of the storage medium.

12. A method comprising:
    sampling, via a converter, a signal read from a storage medium to generate a sample, wherein the signal includes a physical address of data read from a track on the storage medium;
    generating a clock signal based on a deviation of the track from a reference line;
    generating a first scale factor based on the clock signal;
    multiplying the sample by the first scale factor to generate a first scaled sample;
    integrating the first scaled sample over a period of the clock signal to generate a first resultant value;
    comparing the first resultant value to a threshold to generate an output, wherein the output indicates whether no phase imperfection exists in the first scaled sample; and
    based on the output of the comparator, decoding the first resultant value to obtain the physical address of the data.

13. The method of claim 12, wherein the deviation of the track on the storage medium is a sinusoidal deviation of the track relative to the reference line.

14. The method of claim 12, further comprising:
    integrating the first scaled sample over a half of the period of the clock signal to generate a second resultant value;
    based on the output of the comparator, selecting, via a multiplexer, the first resultant value or the second resultant value; and
    decoding the first resultant value or the second resultant value to obtain the physical address of the data.

15. The method of claim 14, wherein the half of the period of the clock signal is (i) a first half of the period of the clock signal, or (ii) a second half of the period of the clock signal.

16. The method of claim 14, wherein:
    if the first resultant value is greater than the threshold, decoding the first resultant value; and if the first resultant value is less than the threshold, decoding the second resultant value.

17. The method of claim 14, further comprising:
determining an absolute value of the first resultant value, comparing the absolute value of the first resultant value to the threshold to generate the output of the comparator.

18. The method of claim 14, wherein:
if an output of the multiplexer is the first resultant value, no phase imperfection exists in the first scaled sample; and
if the output of the multiplexer is the second resultant value, (i) a phase imperfection exists in the first scaled sample, or (ii) no phase imperfection exists in the first scaled sample.

19. The method of claim 14, further comprising:
generating a second scale factor based on the clock signal;
multiplying the sample out of the converter by the second scale factor to generate a second scaled sample;
integrating the second scaled sample over the period of the clock signal to generate a third resultant value;
generating an error signal based on the first resultant value and the third resultant value; and
sampling the signal read from the storage medium based on the error signal.

20. The method of claim 12, further comprising:
generating a second scale factor based on the clock signal;
multiplying the sample out of the converter by the second scale factor to generate a second scaled sample;
integrating the second scaled sample over the period of the clock signal to generate a second resultant value;
generating an error signal based on the first resultant value and the second resultant value; and
sampling the signal read from the storage medium based on the error signal.

\* \* \* \* \*